United States Patent Office 3,322,590
Patented May 30, 1967

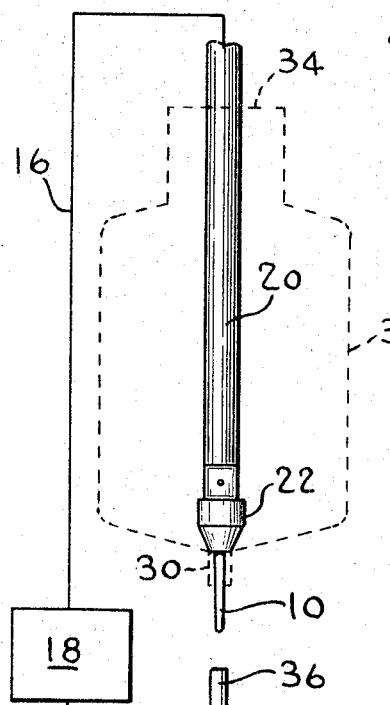
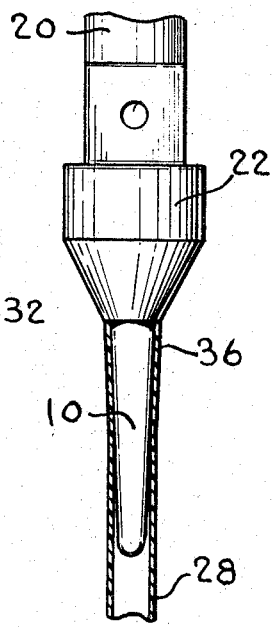
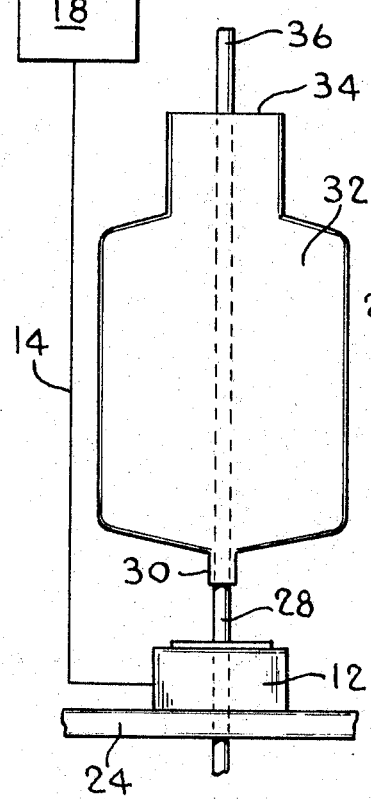
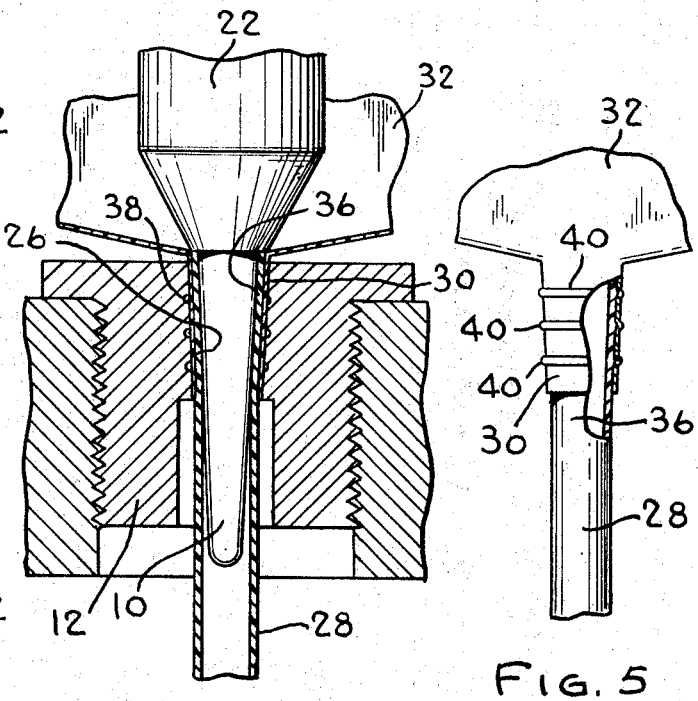
May 30, 1967     J. L. CLARK     3,322,590
METHOD FOR MAKING A SEALED CONNECTION
BETWEEN A TUBE AND A CONTAINER
Filed March 9, 1964
FIG. 1
FIG. 2
FIG. 3
FIG. 4
FIG. 5
INVENTOR
JAMES L. CLARK
BY John W. Michael
ATTORNEY

3,322,590
METHOD FOR MAKING A SEALED CONNECTION BETWEEN A TUBE AND A CONTAINER
James L. Clark, Whitefish Bay, Wis., assignor, by direct and mesne assignments, to Plastronics, Inc., Milwaukee, Wis., a corporation of Wisconsin
Filed Mar. 9, 1964, Ser. No. 350,492
5 Claims. (Cl. 156—273)

This invention relates to an improved method and apparatus for making a sealed connection between a tube and a flexible container.

The object of this invention is to provide such a method and apparatus which is effective to produce a sound seal at a high rate of efficiency.

Another object is to produce a sealed connection having a pleasing outward appearance.

Other objects and advantages will be pointed out in, or be apparent from the specification and claims, as will obvious modifications of the single embodiment shown in the drawings, in which:

FIG. 1 is a partially schematic side elevation view of the apparatus of this invention showing the initial step of the method;

FIGS. 2, 3 and 4 are fragmentary side elevation views showing successive steps of the method; and FIG. 5 is a fragmentary side elevation view (with parts broken away) of a completed sealed connection.

Referring to the drawings in detail, FIG. 1 shows the apparatus of this invention which includes a probe-type welding electrode 10 and a ring-shaped electrode 12 connected by conductors 14, 16 to a high frequency welding generator indicated schematically by reference numeral 18. Generator 18 may be of any suitable construction well known in the art which is designed to produce high frequency power for welding plastic and other materials.

Probe 10 is mounted on the end of a support rod 20 which is preferably mounted for vertical movement with respect to ring electrode 12 by any suitable arrangement. A stop member 22 is provided between rod 20 and probe 10 as shown.

Ring electrode 12 is fixedly mounted on a bedplate member 24 and has a tapered central opening 26 therein which is dimensioned to mate with the tapered contour of probe electrode 10.

The steps of the method are as follows. The first step is to insert a tube 28 through the nipple portion 30 of a plastic container 32. This is most easily accomplished by inserting tube 28 through the top opening 34 of bag 32 and then threading it down through nipple 30 to the position shown in FIG. 1. It is also noted that the lower end of tube 28 is inserted downwardly through opening 26 in electrode 12 at this point in the operation. While the material of tube 28 and bag 32 can vary to some extent, it is preferable that they are both made of polyvinyl chloride plastic.

The second step is to insert the upper end 36 of tube 28 over the end of probe 10 as shown in FIG. 2. The parts are dimensioned so that tube 28 will fit snugly on probe 10 and be retained thereon by friction.

The next step is to slide bag 32 upwardly on tube 28 to the position shown in FIG. 3 wherein the nipple 30 overlies the end portion 36 of the tube adjacent stop member 22 on rod 20. It will be appreciated that stop member 22 serves to limit the upward movement of bag 32 on tube 28 so that the proper relationship between the parts is readily and accurately accomplished.

The next step is to lower probe 10 (with tube 28 and bag 32 positioned thereon) into opening 26 in ring electrode 12, as shown in FIG. 4. Due to the taper of opening 26 and probe 10, a vertical downward force applied by means of rod 20 will exert a surface-to-surface pressure between the end of tube 36 and nipple 30 of bag 32. It is desirable that such pressure be produced prior to the welding step that follows to insure full and firm contact between the layers of plastic to be welded together. While the amount of pressure can vary somewhat, it should be great enough to insure complete contact and at the same time should not be so great as to thin out the material to a point where the parts may tend to burn through during welding.

With the parts positioned under pressure as shown in FIG. 4, the welding step is performed by introducing a high frequency welding current to the probes from generator 18. The amount of current necessary will vary with the size and type of materials used and can be determined by the application of prescribed calculations and experiments well known in the art.

The method as outlined above will regularly produce a sound weld between tube 28 and bag 32. As shown in FIG. 4, opening 26 in ring probe 12 may be provided with a plurality of grooves 38 which, in the finished product, will produce corresponding ridges 40 on the outer surface of nipple 30. Such a ridged construction is desirable from an appearance standpoint and further insures the production of sound welds.

Although but one embodiment of the present invention has been illustrated and described, it will be apparent to those skilled in the art that various changes and modifications may be made therein without departing from the spirit of the invention or from the scope of the appended claims.

I claim:
1. The method of making a sealed connection between a plastic tube and a plastic bag having a nipple formed therein comprising the steps of:
   inserting the end of the tube over the end of a tapered probe electrode;
   inserting the nipple portion of the bag over both the tube and the probe so that the wall of the nipple portion lies adjacent the end portion of the tube;
   inserting the probe into a tapered opening in a second electrode; and
   passing an electronic welding current between said electrodes to weld the end of the tube to the nipple portion of the bag.
2. The method according to claim 1 in which the tube is threaded through the nipple portion of the bag prior to inserting the end of the tube over the end of the probe electrode.
3. The method according to claim 1 in which the other end of the tube is inserted through the opening in the second electrode prior to the welding step.
4. The method according to claim 1 in which pressure is applied between the nipple portion of the bag and the end of the tube prior to welding.
5. The method according to claim 4 in which the pressure specified in claim 4 is applied by axially forcing the probe electrode into the opening in the second electrode.

References Cited
UNITED STATES PATENTS
2,386,966  10/1945  MacMillin _____ 219—10.57
2,816,596  12/1957  Welch _____ 156—273

EARL M. BERGERT, *Primary Examiner.*
D. J. DRUMMOND, *Assistant Examiner.*